(12) United States Patent
Kim et al.

(10) Patent No.: US 8,586,230 B2
(45) Date of Patent: Nov. 19, 2013

(54) BATTERY MODULE AND METHOD OF MANUFACTURING THE SAME

(75) Inventors: Sung-Bae Kim, Suwon-si (KR);
Yong-Sam Kim, Suwon-si (KR);
Sang-Won Byun, Suwon-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 555 days.

(21) Appl. No.: 12/801,909

(22) Filed: Jul. 1, 2010

(65) Prior Publication Data

US 2011/0195296 A1 Aug. 11, 2011

(30) Foreign Application Priority Data

Feb. 8, 2010 (KR) .......................... 10-2010-0011470

(51) Int. Cl.
*H01M 6/42* (2006.01)
*H01M 2/24* (2006.01)

(52) U.S. Cl.
USPC ............ 429/158; 429/151; 429/159; 429/160

(58) Field of Classification Search
USPC .................................. 429/151, 158, 159, 160
See application file for complete search history.

(56) References Cited

U.S. PATENT DOCUMENTS

| 5,460,317 | A * | 10/1995 | Thomas et al. ............. 228/112.1 |
| 7,575,148 | B2 | 8/2009 | Kubouchi et al. |
| 7,659,029 | B2 | 2/2010 | Ota et al. |
| 2001/0049054 | A1 * | 12/2001 | Enomoto et al. .............. 429/158 |
| 2002/0179674 | A1 * | 12/2002 | Schilling et al. ............... 228/2.1 |
| 2004/0129763 | A1 * | 7/2004 | Burford et al. ............. 228/112.1 |
| 2005/0011932 | A1 * | 1/2005 | Ehrstrom et al. .......... 228/112.1 |
| 2006/0088761 | A1 * | 4/2006 | Ota et al. ....................... 429/130 |
| 2006/0091855 | A1 | 5/2006 | Seo |
| 2007/0099074 | A1 | 5/2007 | Yoon et al. |
| 2009/0123830 | A1 | 5/2009 | Kato et al. |
| 2011/0104566 | A1 * | 5/2011 | Byun et al. ..................... 429/211 |

FOREIGN PATENT DOCUMENTS

| JP | 2002151045 A | * | 5/2002 |
| JP | 2003-019575 A | | 1/2003 |
| JP | 2005-118877 A | | 5/2005 |
| KR | 10-2006-0023470 A | | 3/2006 |
| KR | 10 2006-0037604 A | | 5/2006 |
| KR | 10-2006-0049327 A | | 5/2006 |
| KR | 10 2007-0047378 A | | 5/2007 |
| KR | 10-2008-0022129 A | | 3/2008 |

OTHER PUBLICATIONS

Korean Notice of Allowance in KR 10-2010-0011470, dated Nov. 30, 2011 (Kim, et al.).
Korean Office Action in KR 10-2010-0011470, dated May 16, 2011 (Kim, et al.).

* cited by examiner

*Primary Examiner* — Carlos Barcena
(74) *Attorney, Agent, or Firm* — Lee & Morse, P.C.

(57) ABSTRACT

A battery module and a method of manufacturing the same, the battery module including a plurality of rechargeable batteries, each rechargeable battery including a positive electrode terminal and a negative electrode terminal formed of different materials; a bus bar electrically connecting the plurality of rechargeable batteries; a first terminal plate for installing the bus bar, the first terminal plate being coupled to the positive electrode terminal via a first welding portion; and a second terminal plate for installing the bus bar, the second terminal plate being coupled to the negative electrode terminal via a second welding portion, at least one of the first welding portion and the second welding portion being a friction stir weld.

15 Claims, 9 Drawing Sheets

BATTERY MODULE AND METHOD OF MANUFACTURING THE SAME

BACKGROUND

1. Field

Embodiments relate to a battery module and a method of manufacturing the same.

2. Description of the Related Art

Rechargeable batteries refer to batteries that can be repeatedly charged. Low capacity rechargeable batteries may be used in small mobile devices, e.g., cellular phones, laptop computers, and camcorders. Large capacity rechargeable batteries may be used as a power supply for driving a motor in, e.g., hybrid electric automobiles.

A rechargeable battery has an electrode assembly including positive electrodes, negative electrodes, and separators are wound in the form of a jelly roll. The electrode assembly is mounted in a case through an opening of the case; and the opening is covered by a cap assembly. A collector plate is installed at an end portion of the electrode assembly; and the collector plate is electrically connected to a terminal unit mounted to the cap assembly. Accordingly, by connecting an external terminal to the terminal unit of the cap assembly, a current generated in the electrode assembly passes through the collector plate and the terminal unit of the cap assembly to be supplied to the external terminal.

The terminal unit includes a terminal plate coupled to the positive electrode terminal and the negative electrode terminal to connect a positive electrode terminal and a negative electrode terminal that are connected to the collector plate, and a bus bar, and the positive electrode terminal or the negative electrode terminal and the terminal plate, or the terminal plate and the bus bar, are coupled to each other by laser welding.

SUMMARY

Embodiments are directed to a battery module and a method of manufacturing the same, which represent advances over the related art.

It is a feature of an embodiment to provide a battery module in which high bonding strength is provided even when terminals formed of different types of metals are bonded together.

At least one of the above and other features and advantages may be realized by providing a battery module including a plurality of rechargeable batteries, each rechargeable battery including a positive electrode terminal and a negative electrode terminal formed of different materials; a bus bar electrically connecting the plurality of rechargeable batteries; a first terminal plate for installing the bus bar, the first terminal plate being coupled to the positive electrode terminal via a first welding portion; and a second terminal plate for installing the bus bar, the second terminal plate being coupled to the negative electrode terminal via a second welding portion, at least one of the first welding portion and the second welding portion being a friction stir weld.

The at least one of the first welding portion and the second welding that is a friction stir weld may be a heterogeneous metal weld.

The positive electrode terminal, the first terminal plate, and the second terminal plate may be formed of aluminum, and the negative electrode terminal may be formed of copper.

The positive electrode terminal may be formed of aluminum, and the negative electrode terminal and the first and second terminal plates may be formed of copper.

The at least one of the first and second welding portions that is a friction stir weld may include a nugget zone with a mixture of two welded materials.

The battery module may further include a thermo-mechanically affected zone surrounding the nugget zone, and a heat affected zone surrounding the thermo-mechanically affected zone.

The battery module may further include a first boundary portion at an end portion of the positive electrode terminal that is riveted to overlap the first terminal plate, and a second boundary portion at an end portion of the negative terminal that is riveted to overlap the second terminal plate.

The first welding portion and the second welding portion may be disposed on a plurality of spots at predetermined distances along the first boundary portion and the second boundary portion, respectively.

The first welding portion and the second welding portion may be continuously disposed along the first boundary portion and the second boundary portion, respectively.

The first welding portion and the second welding portion may respectively cover the first boundary portion and the second boundary portion and an entirety of the positive electrode terminal and the negative electrode terminal.

At least one of the above and other features and advantages may also be realized by providing a battery module including a plurality of rechargeable batteries, each rechargeable battery including a positive electrode terminal and a negative electrode terminal formed of different materials; a bus bar electrically connecting the plurality of rechargeable batteries; a first terminal plate for installing the bus bar, the first terminal plate being coupled to the positive electrode terminal; a second terminal plate for installing the bus bar, the second terminal plate being coupled to the negative electrode terminal; a first welding portion where the bus bar and the first terminal plate are welded to each other; and a second welding portion where the bus bar and the second terminal plate are welded to each other, at least one of the first welding portion and the second welding portion being a friction stir weld.

The at least one of the first welding portion and the second welding portion that is a friction stir weld may be a heterogeneous metal weld.

The first terminal plate and the bus bar may be formed of aluminum, and the second terminal plate may be formed of copper.

The first terminal plate may be formed of aluminum, and the second terminal plate and the bus bar may be formed of copper.

The at least one of the first and second welding portions that is a friction stir weld may include a nugget zone with a mixture of two welded materials.

The battery module may further include a thermo-mechanically affected zone surrounding the nugget zone, and a heat affected zone surrounding the thermo-mechanically affected zone.

At least one of the above and other features and advantages may also be realized by providing a method of manufacturing a battery module, the method including welding a first terminal plate and a second terminal plate to a positive electrode terminal and a negative electrode terminal of a battery, respectively; and welding the first terminal plate and the second terminal plate to a bus bar such that the battery is connected to an adjacent battery, wherein at least one of welding the first terminal plate to the positive electrode terminal and welding the second terminal plate to the negative electrode terminal is carried out at a welding portion where heterogeneous metal welding is conducted by friction stir welding.

Another of welding the first terminal plate to the positive electrode terminal and welding the second terminal plate to the negative electrode terminal may be carried out at a welding portion by homogeneous metal welding through laser welding.

At least one of the above and other features and advantages may also be realized by providing a method of manufacturing a battery module, the method including welding a first terminal plate and a second terminal plate to a positive electrode terminal and a negative electrode terminal of a battery, respectively; and welding the first terminal plate and the second terminal plate to a bus bar such that the battery is connected to an adjacent battery, wherein at least one of welding the first terminal plate to the bus bar and welding the second terminal plate to the bus bar is carried out at a welding portion where heterogeneous metal welding is conducted by friction stir welding.

Another of welding the first terminal plate to the bus bar and welding the second terminal plate to the bus bar may be carried out at a welding portion by homogeneous metal welding through laser welding.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
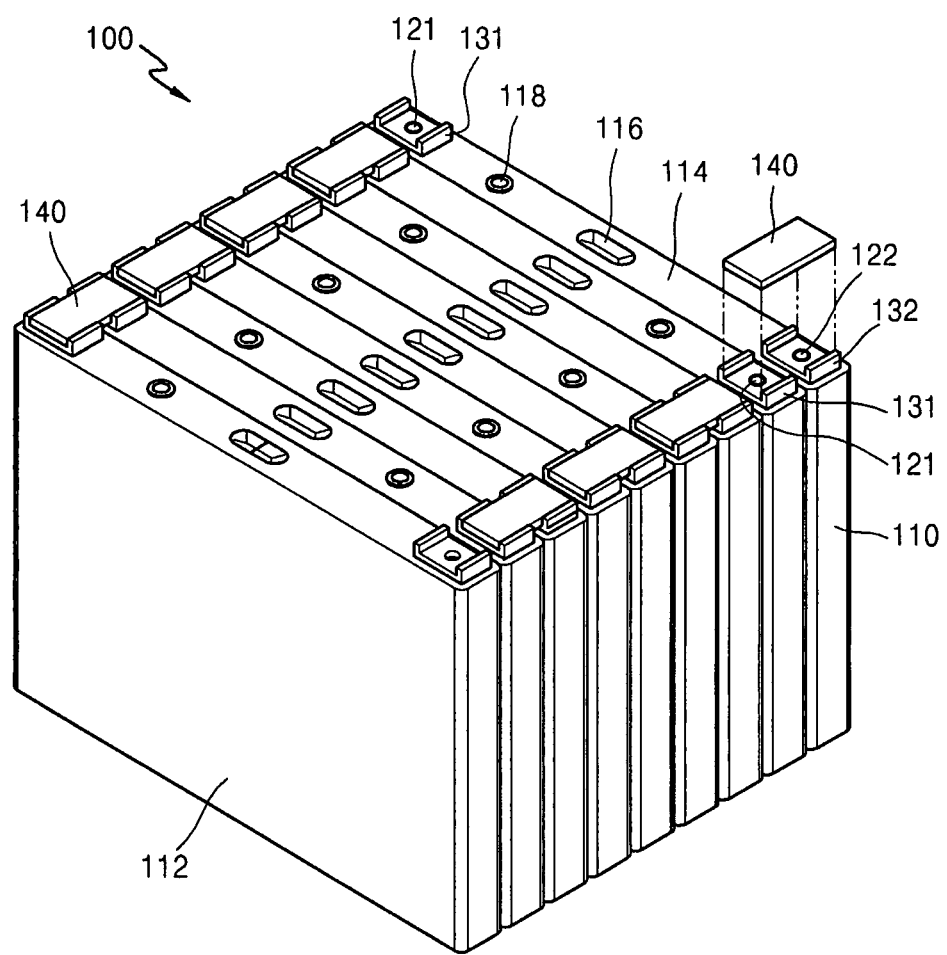
FIG. 1 illustrates a perspective view of a battery module according to an embodiment.

Korean Patent Application No. 10-2010-0011470, filed on Feb. 8, 2010, in the Korean intellectual property office, and entitled: "Battery Module and Method of Manufacturing the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
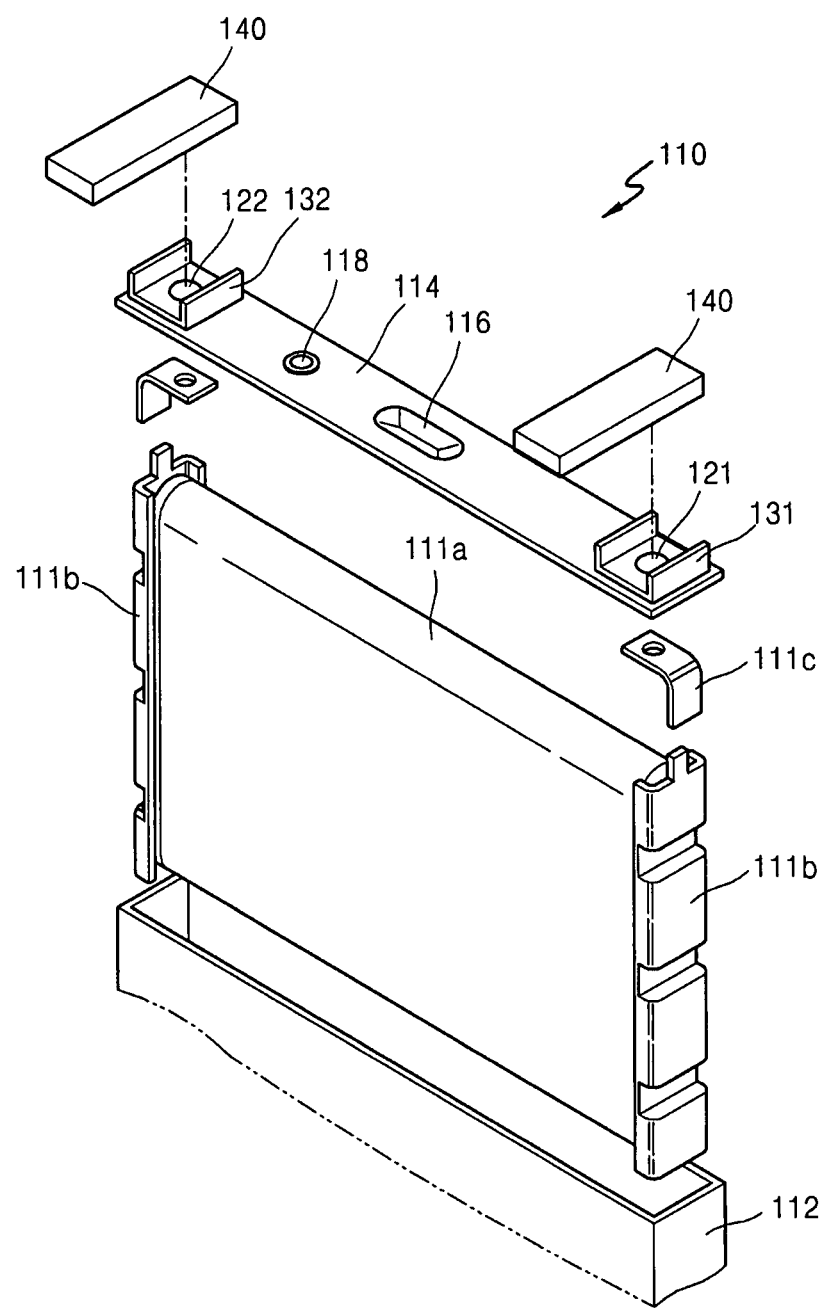
FIG. 2 illustrates an exploded perspective view of a rechargeable battery of the battery module of FIG. 1.

FIG. 1 illustrates a battery module 100 according to an embodiment. FIG. 2 illustrates a rechargeable battery 110 of the battery module 100.

First, referring to FIG. 2, the rechargeable battery 110 may include an electrode assembly 111a including a positive electrode, a negative electrode, and a separator wound in the form of a jelly roll, two collector plates 111b respectively coupled to two end portions of the electrode assembly 111a, a case 112 that accommodates the electrode assembly 111a and the collector plates 111b, and a cap plate 114 coupled to an opening of the case 112. Accordingly, the electrode assembly 111a to which the collector plates 111b is attached may be mounted through the opening of the case 112 and then the cap plate 114 may be covered on the opening of the case 112, thereby completing the rechargeable battery 110 in which the electrode assembly 111a is safely accommodated.

A sealing member 118 may seal an inlet of the case 112 after injecting an electrolyte solution into the case 112. A safety vent 116 that breaks open if pressure in the case 112 is excessive so as to discharge gas out of the case 112 may be disposed in the cap plate 114. According to the present embodiment, the rechargeable battery 110 may have a quadrilateral shape, but is not limited thereto. In an implementation, the rechargeable battery 110 may be cylindrical or have other shapes.

Figure 3:
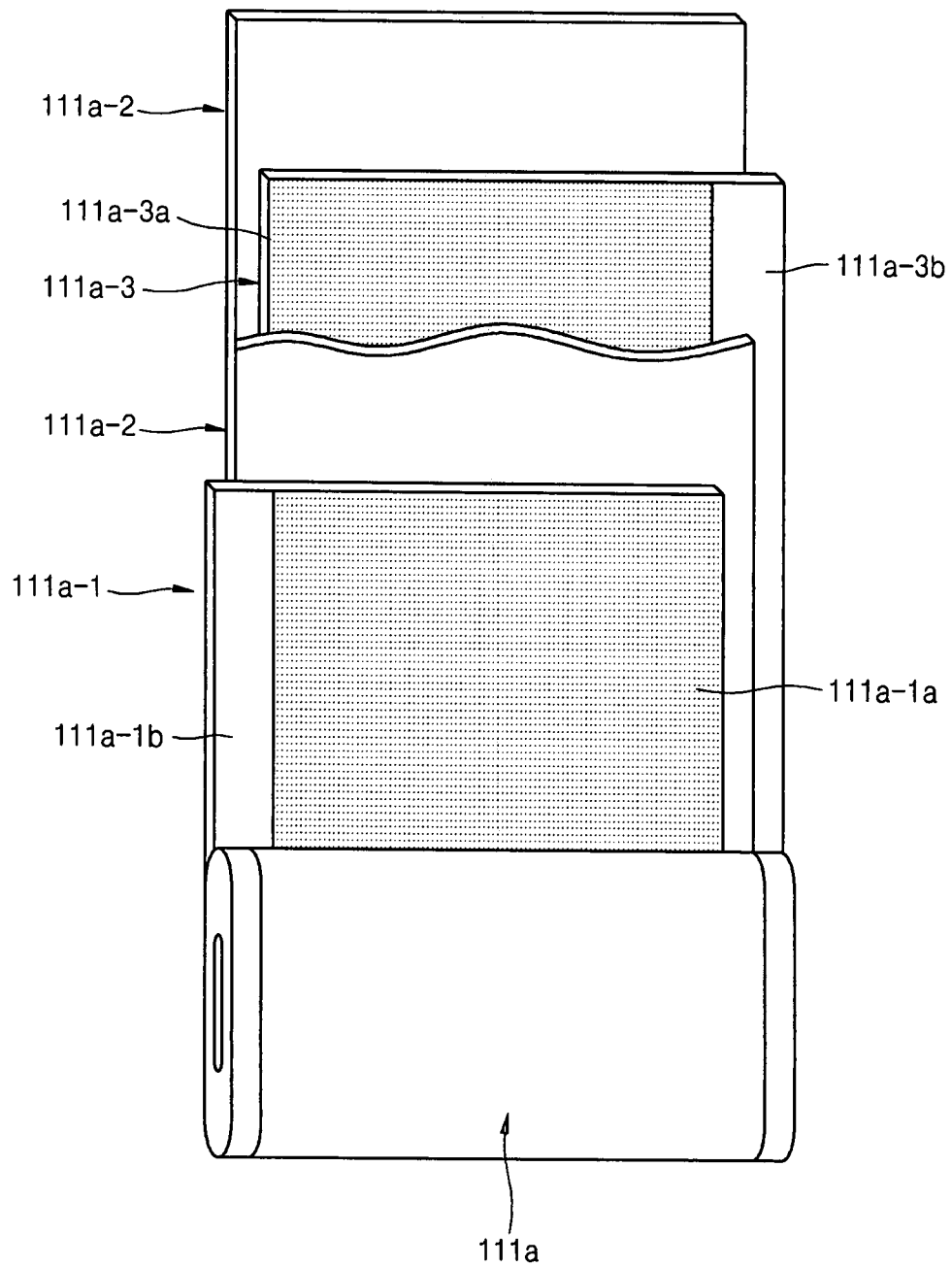
FIG. 3 illustrates a schematic view of an electrode assembly of the rechargeable battery of FIG. 2.

As illustrated in FIG. 3, the electrode assembly 111a may include a positive electrode 111a-1, a separator 111a-2, and a negative electrode 111a-3 that are alternately stacked and wound in the form of a jelly roll. A positive electrode active material 111a-1a may be coated on the positive electrode 111a-1; and a negative electrode active material 111a-3a may be coated on the negative electrode 111a-3. Non-coated portions 111a-1b and 111a-3b on which an active material is not coated may be disposed at end portions of the positive electrode active material 111a-1a and the negative electrode active material 111a-3a. The non-coated portion 111a-1b of the positive electrode 111a-1 may be disposed at a first side of the electrode assembly 111a; and the non-coated portion 111a-3b of the negative electrode 111a-3 may be disposed at a second side of the electrode assembly 111a. That is, referring to FIG. 3, the non-coated portion 111a-1b of the positive electrode 111a-1 may be disposed on the left side in FIG. 3; and the non-coated portion 111a-3b of the negative electrode 111a-3 may be disposed on the right side in FIG. 3. Consequently, the collector plate 111b attached on the left side of FIG. 2 may be electrically connected to a plurality of the positive electrodes 111a-1; and the collector plate 111b attached on the right side of FIG. 2 may be electrically connected to a plurality of the negative electrodes 111a-3. The collector plates 111b may pass through a lead member 111c (see FIG. 2) to be connected to a positive electrode terminal 121 and a negative electrode terminal 122, respectively.

First and second terminal plates 131 and 132 respectively welded to the positive electrode terminal 121 and the negative electrode terminal 122 and a plurality of bus bars 140 welded to the first and second terminal plates 131 and 132 to form a serial or parallel connection structure with adjacent rechargeable batteries may also be included.

The rechargeable batteries 110 may be electrically connected to one another via the bus bars 140, thereby forming the battery module 100 as illustrated in FIG. 1.

The rechargeable batteries 110 arranged parallel to one another, as illustrated in FIG. 1, may be serially connected to one another via the bus bars 140. The positive electrode terminal 121 and the negative electrode terminal 122 of adjacent rechargeable batteries 110 may be arranged such that the positive electrode terminal 121 of one of the rechargeable batteries 110 and the negative electrode terminal 122 of an adjacent rechargeable battery 110 are connected to each other, e.g., by welding. However, the embodiments are not limited thereto; and the rechargeable batteries 110 may also be connected in parallel.

According to the present embodiment, the positive electrode terminal 121 and the negative electrode terminal 122 may be formed of different materials, e.g., aluminum and copper, respectively. The first and second terminal plates 131 and 132 and the bus bars 140 may be formed of aluminum like the positive electrode terminal 121. In this case, copper-aluminum heterogeneous metal welding may be carried out between the negative electrode terminal 122 and the second terminal plate 132; and aluminum-aluminum homogeneous metal welding may be carried out between the positive electrode terminal 121 and the first terminal plate 131 or between the first or second terminal plate 131 or 132 and the bus bars 140.

In the case of homogeneous metal welding, a sufficient welding strength may be obtained by laser welding, and thus the homogeneous metal welding may be conducted using a typical method. However, for the heterogeneous metal welding between the negative electrode terminal 122 and the second terminal plate 132, the welding process may be carried out using a friction stir welding method. For convenience, a welding portion between the positive electrode terminal 121 and the first terminal plate 131 is referred to as a first welding portion; and a welding portion between the negative electrode terminal 122 and the second terminal plate 132 is referred to as a second welding portion. The first welding portion may be formed by laser welding, since it is homogeneous metal welding. The second welding portion may be formed using the friction stir welding method to obtain sufficient weld strength, since it is heterogeneous metal welding. However, in an implementation, the first welding portion may also be formed by using the friction stir welding method.

In the friction stir welding method, welding may be carried out by applying frictional heat to portions to be welded using a welding tool. The welding portions may be coupled to each other at a relatively low temperature compared to the laser welding. Thus a heat affected zone may be narrow; and welding portions of two members may be uniformly mixed due to the friction stirring of the welding tool, thereby providing uniform and high welding strength.

Figure 4A:
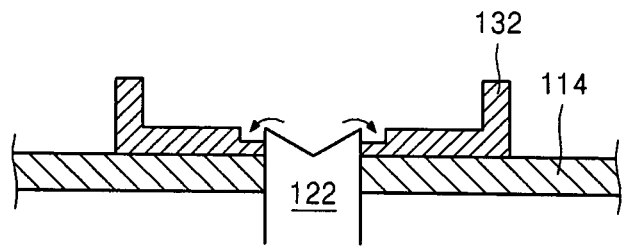
FIGS. 4A through 4C illustrate stages in a method of welding a negative electrode terminal and a second terminal plate in the battery module of FIG. 1.
Figure 4B:
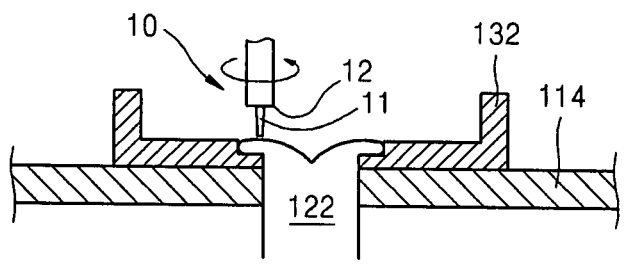
Figure 4C:
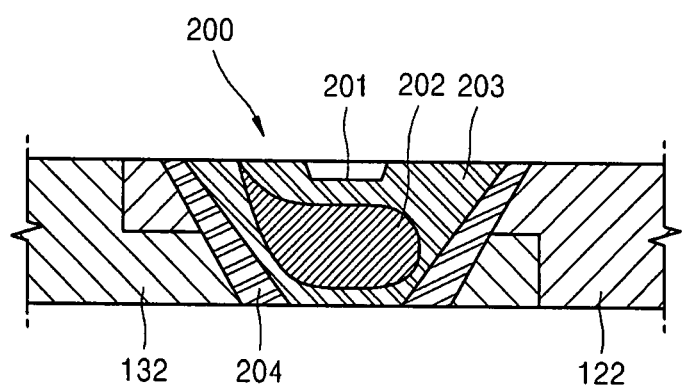

FIGS. 4A and 4B illustrate stages in a method of welding the negative electrode terminal 122 and the second terminal plate 132 using a friction stir welding method. First, as illustrated in FIG. 4A, an end portion of the negative electrode terminal 122 may be riveted such that the end portion of the negative electrode terminal 122 overlaps with the second terminal plate 132. Then, a welding tool 10 may be used on the overlapped boundary portion of the negative electrode terminal 122 and the second terminal plate 132 to carry out friction stir welding as illustrated in FIG. 4B. Then, the welding tool 10 may rotate while contacting an interface between the negative electrode terminal 122 and the second terminal plate 132, thereby generating frictional heat. Accordingly, materials around the interface between the negative electrode terminal 122 and the second terminal plate 132 may be partially heated and mixed, thereby being rigidly welded. The welding tool 10 may include a pin 11 and a shoulder 12 that supports the pin 11. As illustrated in FIG. 4C, a portion that contacts the shoulder 12 is a welding portion 200; and a welding groove 201 may be formed in a portion into which the pin 11 of the welding portion 200 is inserted.

The welding portion 200 may include a nugget zone 202 formed by dynamic recrystallization, a thermo-mechanically affected zone (TMAZ) 203, and a heat affected zone (HAZ) 204.

In the nugget zone 202, restoration and recrystallization may occur due to high heat and deformation. Thus the nugget zone 202 is also referred to as a dynamic recrystallization zone. The nugget zone 202, unlike typical welding in which melting occurs due to heat, may be formed by dynamic recrystallization in a solid state at a melting point of the material, or lower, due to friction stirring. A diameter of the nugget zone 202 may usually be greater than a diameter of the pin 11 and smaller than a diameter of the shoulder 12. A size of the nugget zone 202 may vary according to a rotational speed of the welding tool 10. Maintaining the rotational speed of the welding tool 10 sufficiently low may help ensure that a form of crystalline grains is complete, thereby preventing generation of defects.

In the thermo-mechanically affected zone 203, partial recrystallization may occur by plastic deformation due to friction on a contacting surface with the shoulder 12 of the welding tool 10. In other words, thermal deformation due to friction and mechanical deformation due to the shoulder 12 may occur at the same time. In the thermo-mechanically affected zone 203, crystalline structures that are softened due to extreme plastic flows and deformation of the material may be distributed in angular directions.

The heat affected zone 204 may be more affected by heat than the thermo-mechanically affected zone 203. Thus, the heat affected zone 204 may include oblique crystalline grains and a plurality of pores.

By using the friction stir welding method, the second terminal plate 132 formed of, e.g., aluminum, and the negative electrode terminal 122 formed of, e.g., copper, may be easily bonded to each other. Copper and aluminum have different melting points; and when they are welded by, e.g., resistance welding, ultrasonic welding or laser welding, defects are highly likely to be generated in portions being welded; and the welded portions may fall off due to an external impact and vibration.

However, when the negative electrode terminal 122 and the second terminal plate 132 are welded using the friction stir welding method of an embodiment, the welding process is conducted in a solid state, and thus materials having different melting points may be stably welded. In particular, the nugget zone 202 at a center portion of the welding portion 200 may be an area where dynamic recrystallization occurs and may be resistant to an external impact and vibration. Also, the thermo-mechanically affected zone 203 may be an area where the negative electrode terminal 122 and the second terminal plate 132 are bonded to each other by being rotated together, in which base materials are mixed in the thermo-mechanically affected zone 203. Thus, the thermo-mechanically affected zone 203 may be resistant to an external impact and vibration.

Also, the friction stir welding method may not require a heat source, a welding rod, or a welding filler material, unlike other welding methods. Thus, friction stir welding is environmentally friendly in that harmful rays or harmful materials are not generated during the welding process. Also, coagulation or cracks which may be generated in a fusion bonding process due to the dynamic recrystallization may be prevented; and deformation may be hardly generated therein and thus exhibits improved mechanical properties. Accordingly, by using the friction stir welding method, a very stable and high welding strength may be obtained.

Figure 5A:
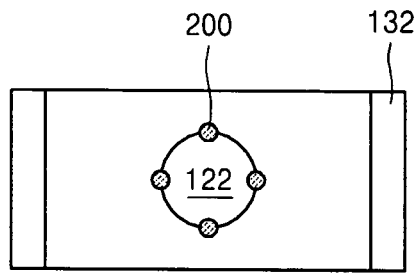
FIGS. 5A through 5C illustrate examples of a welding portion formed using the process illustrated in FIGS. 4A through 4C.
Figure 5B:
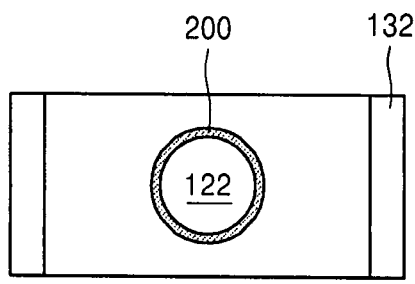
Figure 5C:
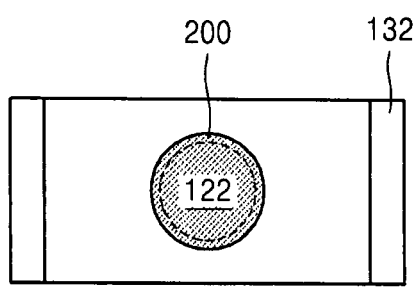

FIGS. 5A through 5C illustrate examples of a welding portion formed using the process illustrated in FIGS. 4A through 4C. The welding portion 200 may be formed as the welding tool 10 carries out welding on some portions of an interface between the negative electrode terminal 122 and the second terminal plate 132, as illustrated in FIG. 5A. Alternatively, the welding portion 200 may be formed as the welding tool 10 continuously carries out welding along the interface, as illustrated in FIG. 5B. In another implementation, a large-size welding portion 200 may be formed by using a large welding tool (not illustrated) which is able to cover the whole, i.e., an entirety of the, negative electrode terminal 122 including the interface, as illustrated in FIG. 5C. Also, in the case of welding the positive electrode terminal 121 and the first terminal plate 131 or welding the first and second terminal plates 131 and 132 and the bus bar 140, a sufficient welding strength may be obtained by laser welding, since it is homogeneous metal welding. However, if a greater welding strength is desired, the friction stir welding method may also be used.

Hereinafter, an embodiment in which the positive electrode terminal 121 is formed of aluminum and the negative electrode terminal 122, the first and second terminal plates 131 and 132, and the bus bar 140 are formed of copper will be described.

In the present embodiment, aluminum-copper heterogeneous metal welding may be carried out between the positive electrode terminal 121 and the first terminal plate 131. In addition, copper-copper homogeneous metal welding may be carried out between the negative electrode terminal 122 and the second terminal plate 132 or between the first and second terminal plates 131 and 132 and the bus bars 140.

Thus, the homogeneous metal welding in which melting points of metals are the same may be conducted using a method of the related art since sufficient welding strength may be obtained by using a typical laser welding method. However, the positive electrode terminal 121 and the first terminal plate 131, which require heterogeneous metal welding, may be welded using a friction stir welding method. A welding portion between the positive electrode terminal 121 and the first terminal plate 131 is referred to as a first welding portion; and a welding portion between the negative electrode terminal 122 and the second terminal plate 132 is referred to as a second welding portion. The second welding portion may be welded by laser welding since it is homogeneous metal welding; and the first welding portion may be welded by using the friction stir welding method to obtain weldability.

Figure 6A:
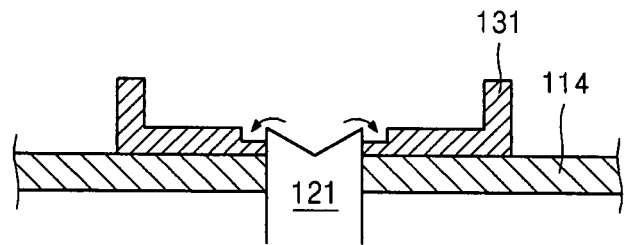
FIGS. 6A through 6C illustrate stages in a method of welding a positive electrode terminal and a first terminal plate in the battery module of FIG. 1.
Figure 6B:
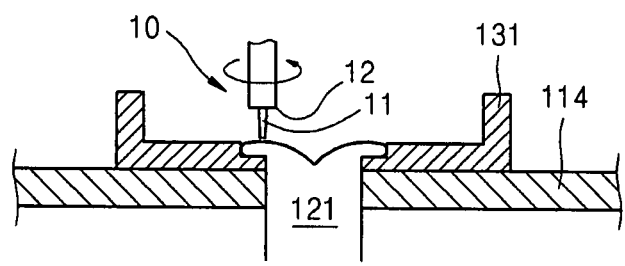

FIGS. 6A and 6B illustrate stages in a method of welding the first welding portion 300. As described above with reference to FIGS. 4A and 4B, first, an end portion of the positive electrode terminal 121 may be riveted to form a boundary portion that overlaps with the first terminal plate 131 (see FIG. 6A). Then, a welding tool 10 may be used on the boundary portion to carry out friction welding (see FIG. 6B). Consequently, a first welding portion 300 including a welding groove 301, a nugget zone 302, a thermo-mechanically affected zone 303, and a heat affected zone 304 may be formed (see FIG. 6C).

Figure 6C:
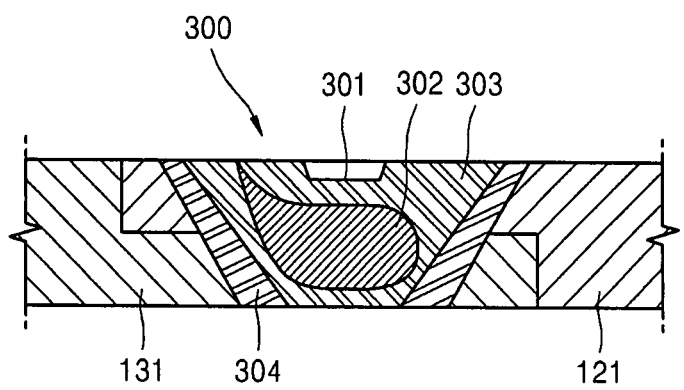
Figure 7A:
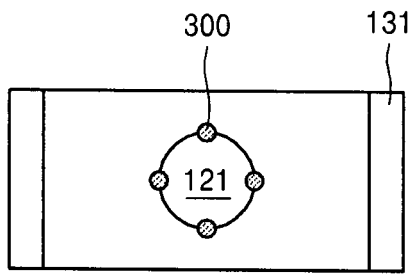
FIGS. 7A through 7C illustrate examples of a welding portion formed using the process illustrated in FIGS. 6A through 6C.
Figure 7B:
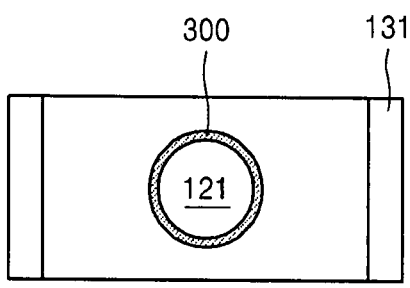
Figure 7C:
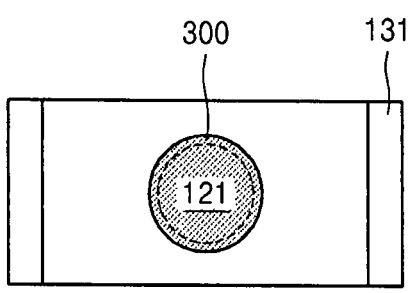

FIGS. 7A through 7C illustrate examples of a welding portion formed using the process illustrated in FIGS. 6A through 6C. The first welding portion 300 may be formed as the welding tool 10 carries out welding on some portions of an interface between the positive electrode terminal 121 and the first terminal plate 131, as illustrated in FIG. 7A. In another implementation, the first welding portion 300 may be formed as the welding tool 10 continuously conducts welding along the interface, as illustrated in FIG. 7B. Alternatively, a large-size welding portion 300 may be formed by using a large welding tool (not illustrated) which is able to cover an entirety of the positive electrode terminal 121 including the interface, as illustrated in FIG. 7C.

Hereinafter, an embodiment in which both the positive electrode terminal 121 and the first terminal plate 131 and both the negative electrode terminal 122 and the second terminal plate 132 are coupled by homogeneous metal welding. That is, both the positive electrode terminal 121 and the first terminal plate 131 may be formed of, e.g., aluminum; and both the negative electrode terminal 122 and the second terminal plate 132 may be formed of, e.g., copper.

Figure 8A:
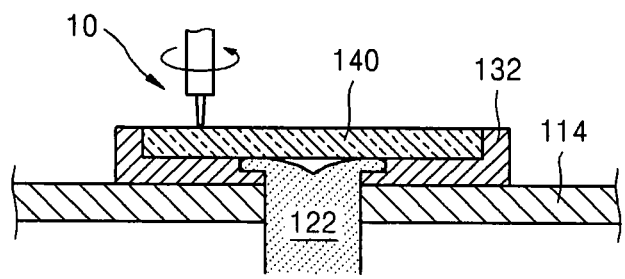
FIGS. 8A through 8C illustrate stages in a method of welding a second terminal plate and a bus bar in the battery module of FIG. 1.
Figure 8B:
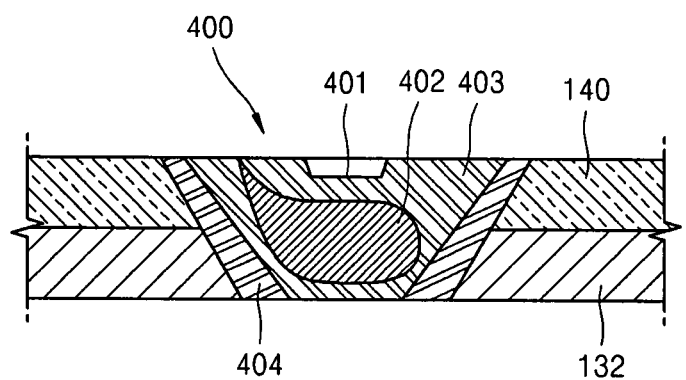
Figure 8C:
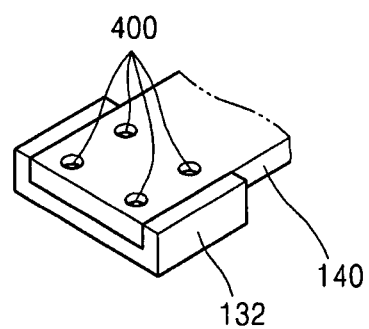

FIGS. 8A through 8C illustrate stages in a method of welding a second terminal plate and a bus bar in the battery module of FIG. 1. In the present embodiment, a sufficient welding strength may be obtained by conventional laser welding since welding between the positive electrode terminal 121 and the first terminal plate 131 and welding between the negative electrode terminal 122 and the second terminal plate 132 are homogeneous metal welding. However, when welding the bus bar 140 to the first and second terminal plates 131 and 132, welding between the bus bar 140 and the first terminal plate 131 or the second terminal plate 132 is heterogeneous metal welding, and thus the welding strength may be weakened if, e.g., laser welding, is used. For example, when the bus bar 140 is formed of aluminum, the bus bar 140 may be coupled without problems to the first terminal plate 131 that is also formed of aluminum. However, when the bus bar 140 is welded to the second terminal plate 132, problems may occur since it is heterogeneous metal welding between aluminum and copper.

Accordingly, in this case, welding between the second terminal plate 132 and the bus bar 140 may be carried out using the friction stir welding method as illustrated in FIG. 8A. In particular, the welding tool 10 may stir a portion of an interface between the second terminal plate 132 and the bus bar 140 while generating frictional heat in some parts of the portion, thereby providing very high welding strength. As illustrated in FIG. 8B, a welding groove 401, a nugget zone 402, a thermo-mechanically affected zone 403, and a heat affected zone 404 may be formed, thereby forming a rigid bonding structure. Referring to FIG. 8C, a plurality of welding portions 400 may be formed in a plurality of spots.

Next, an embodiment includes the positive electrode terminal 121 and the first terminal plate 131 and the negative electrode terminal 122 and the second terminal plate 132 coupled by homogeneous metal welding, and the bus bar 140 is formed of copper. That is, the positive electrode terminal 121 and the first terminal plate 131 may be formed of, e.g., aluminum, and the negative electrode terminal 122 and the second terminal plate 132 may be formed of, e.g., copper.

Figure 9A:
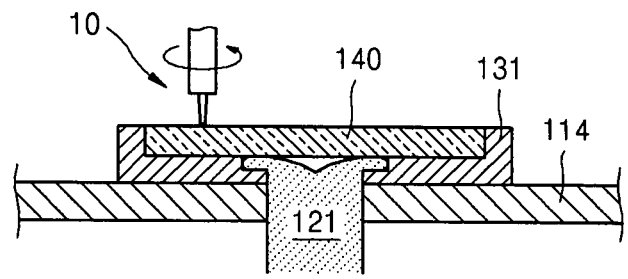
FIGS. 9A through 9C illustrate stages in a method of welding a first terminal plate and a bus bar in the battery module of FIG. 1.
Figure 9B:
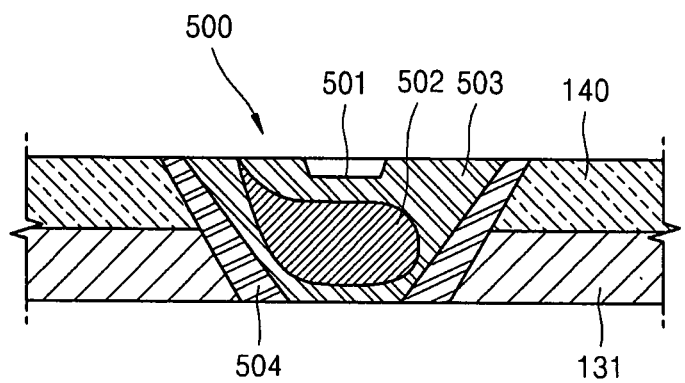
Figure 9C:
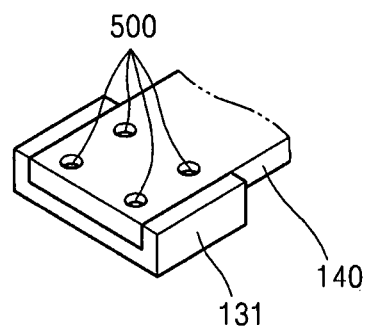

FIGS. 9A through 9C illustrate stages in a method of welding a first terminal plate and a bus bar in the battery module of FIG. 1. In the present embodiment, a sufficient welding strength may be obtained by conventional laser welding since the positive electrode terminal 121 and the first terminal plate 131 and the negative electrode terminal 122 and the second terminal plate 132 are coupled by homogeneous metal welding.

However, the bus bar 140 may be coupled without problems to the second terminal plate 132 that is also formed of copper. However, when the bus bar 140 is welded to the first terminal plate 131, problems may occur since it is heterogeneous metal welding between aluminum and copper.

Accordingly, in the present embodiment, the first terminal plate 131 and the bus bar 140 may be welded using the friction stir welding method as illustrated in FIG. 9A. In particular, the welding tool 10 may stir a portion of an interface between the first terminal plate 131 and the bus bar 140 while generating frictional heat in some parts of the portion, thereby providing very high welding strength. As illustrated in FIG. 9B, a welding groove 501, a nugget zone 502, a thermo-mechanically affected zone 503, and a heat affected zone 504 may be formed, thereby forming a rigid bonding structure. Referring to FIG. 9C, a plurality of welding portions 500 may be formed in a plurality of spots.

As described above, according to the one or more of the embodiments, in regard to the battery module having the above-described structure, a high welding strength may be provided also in the case of heterogeneous metal welding between a terminal and a terminal plate or between a terminal plate and a bus bar.

According to the method of manufacturing a terminal unit of a rechargeable battery according to embodiments, positive and negative electrode terminals and a terminal plate or the terminal plate and a bus bar may be welded using a friction stir welding method. Accordingly, even when the metals that are being welded are different, a high bonding strength may be provided.

In particular, according to an embodiment, since the positive electrode terminal and the negative electrode terminal are usually formed of different metals, and if the terminal plate is formed of the material forming one of the positive and negative electrode terminals, weldability of a portion where heterogeneous metal welding is carried out may be sufficient and thus bonding strength thereof may be great. That is, the positive electrode terminal is usually formed of aluminum and the negative electrode terminal is formed of copper, and regardless of whether the terminal plate is formed of aluminum or copper, the terminal plate is formed of a different material from one of the positive electrode terminal and the negative electrode terminal. Also, a portion where heterogeneous metal welding is carried out may have different melting points. Thus, when the portion is welded using a welding method of an embodiment, the weldability of the portion is maintained.

If the terminal plate is formed of the same material as the positive electrode terminal or the negative electrode terminal and welded, the weldability of the positive and negative electrode terminals and the terminal plate may be maintained. According to an embodiment, when welding a bus bar that connects a plurality of the terminal plates, the weldability of the heterogeneous metal welding may also be maintained. Accordingly, the method of an embodiment may improve weldability of the heterogeneous metal welding.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery module, comprising:
a plurality of rechargeable batteries, each rechargeable battery including a positive electrode terminal and a negative electrode terminal formed of different materials;
a bus bar electrically connecting the plurality of rechargeable batteries;
a first terminal plate on which the bus bar is installed, the first terminal plate being coupled to the positive electrode terminal via a first welding portion, the positive electrode terminal having a rivet shape to overlap the first terminal plate, and the battery module further including a first boundary portion at an end portion of the positive electrode terminal that has the rivet shape overlapping the first terminal plate; and
a second terminal plate on which the bus bar is installed, the second terminal plate being coupled to the negative electrode terminal via a second welding portion, the negative electrode terminal having a rivet shape to overlap the second terminal plate, and the battery module further including a second boundary portion at an end portion of the negative electrode terminal that has the rivet shape overlapping the second terminal plate,
at least one of the first welding portion and the second welding portion being a friction stir weld.

2. The battery module as claimed in claim 1, wherein the at least one of the first welding portion and the second welding that is a friction stir weld is a heterogeneous metal weld.

3. The battery module as claimed in claim 2, wherein:
the positive electrode terminal, the first terminal plate, and the second terminal plate are formed of aluminum, and
the negative electrode terminal is formed of copper.

4. The battery module as claimed in claim 2, wherein:
the positive electrode terminal is formed of aluminum, and
the negative electrode terminal and the first and second terminal plates are formed of copper.

5. The battery module as claimed in claim 1, wherein the at least one of the first and second welding portions that is a friction stir weld includes a nugget zone with a mixture of two welded materials.

6. The battery module as claimed in claim 5, further comprising:
a thermo-mechanically affected zone surrounding the nugget zone, and
a heat affected zone surrounding the thermo-mechanically affected zone.

7. The battery module as claimed in claim 1, wherein the first welding portion and the second welding portion are disposed on a plurality of spots at predetermined distances along the first boundary portion and the second boundary portion, respectively.

8. The battery module as claimed in claim 1, wherein the first welding portion and the second welding portion are continuously disposed along the first boundary portion and the second boundary portion, respectively.

9. The battery module as claimed in claim 1, wherein the first welding portion and the second welding portion respectively cover the first boundary portion and the second boundary portion and an entirety of the positive electrode terminal and the negative electrode terminal.

10. A battery module, comprising:
a plurality of rechargeable batteries, each rechargeable battery including a positive electrode terminal and a negative electrode terminal formed of different materials;

a bus bar electrically connecting the plurality of rechargeable batteries;

a first terminal plate on which the bus bar is installed, the first terminal plate being coupled to the positive electrode terminal, and the positive electrode terminal having a rivet shape to overlap the first terminal plate;

a second terminal plate on which the bus bar is installed, the second terminal plate being coupled to the negative electrode terminal, and the negative electrode terminal having a rivet shape to overlap the second terminal plate;

a first welding portion where the bus bar and the first terminal plate are welded to each other; and a second welding portion where the bus bar and the second terminal plate are welded to each other, at least one of the first welding portion and the second welding portion being a friction stir weld.

11. The battery module as claimed in claim 10, wherein the at least one of the first welding portion and the second welding portion that is a friction stir weld is a heterogeneous metal weld.

12. The battery module as claimed in claim 11, wherein the first terminal plate and the bus bar are formed of aluminum, and the second terminal plate is formed of copper.

13. The battery module as claimed in claim 11, wherein:

the first terminal plate is formed of aluminum, and the second terminal plate and the bus bar are formed of copper.

14. The battery module as claimed in claim 10, wherein the at least one of the first and second welding portions that is a friction stir weld includes a nugget zone with a mixture of two welded materials.

15. The battery module as claimed in claim 14, further comprising:

a thermo-mechanically affected zone surrounding the nugget zone, and a heat affected zone surrounding the thermo-mechanically affected zone.

* * * * *